Feb. 2, 1965   G. F. SAVONUZZI   3,167,914
GAS TURBINE ENGINE HOUSING
Filed July 3, 1961   5 Sheets-Sheet 5
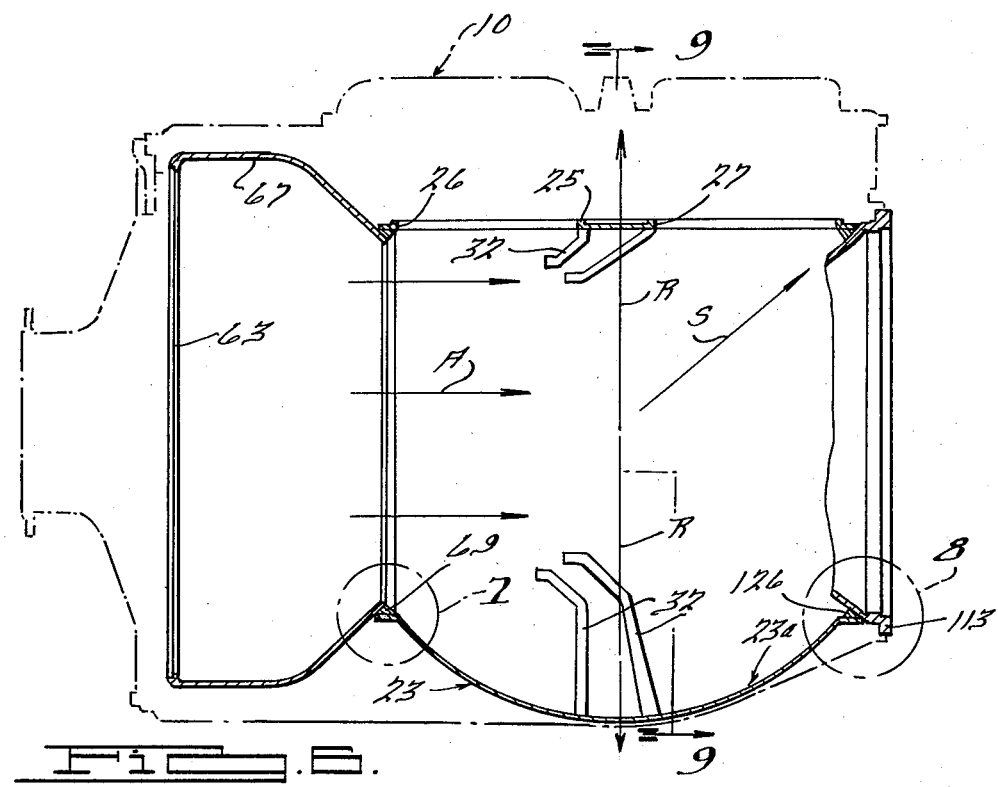
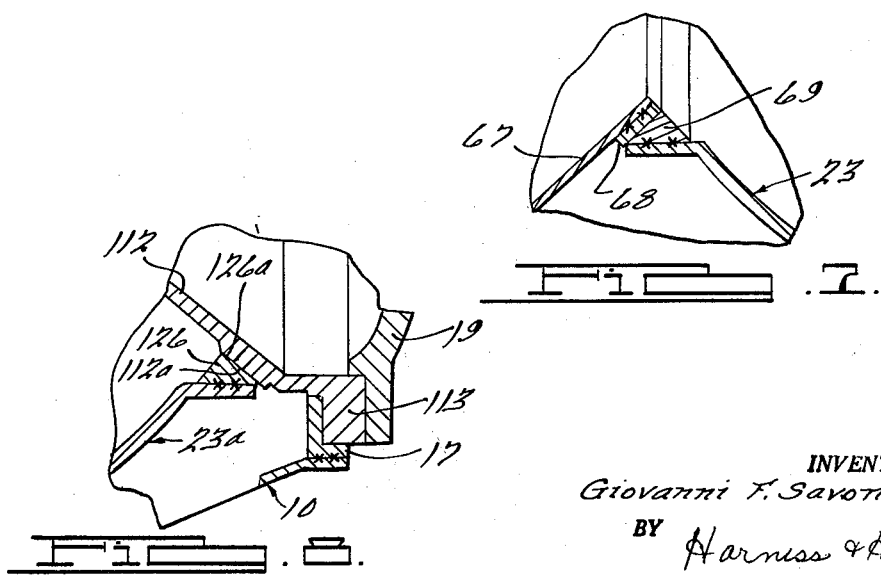
INVENTOR.
Giovanni F. Savonuzzi.
BY Harness & Harris
ATTORNEYS.

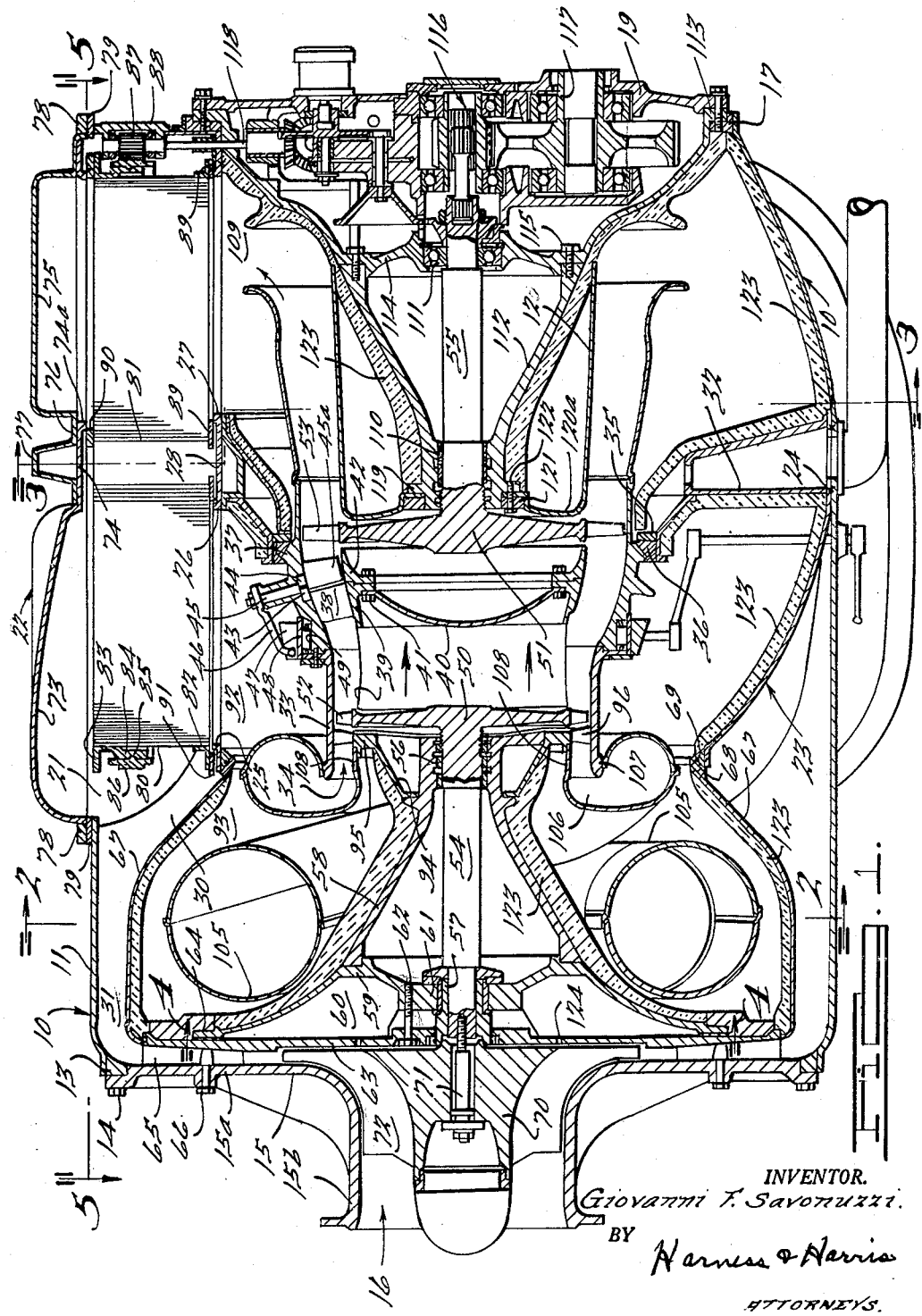

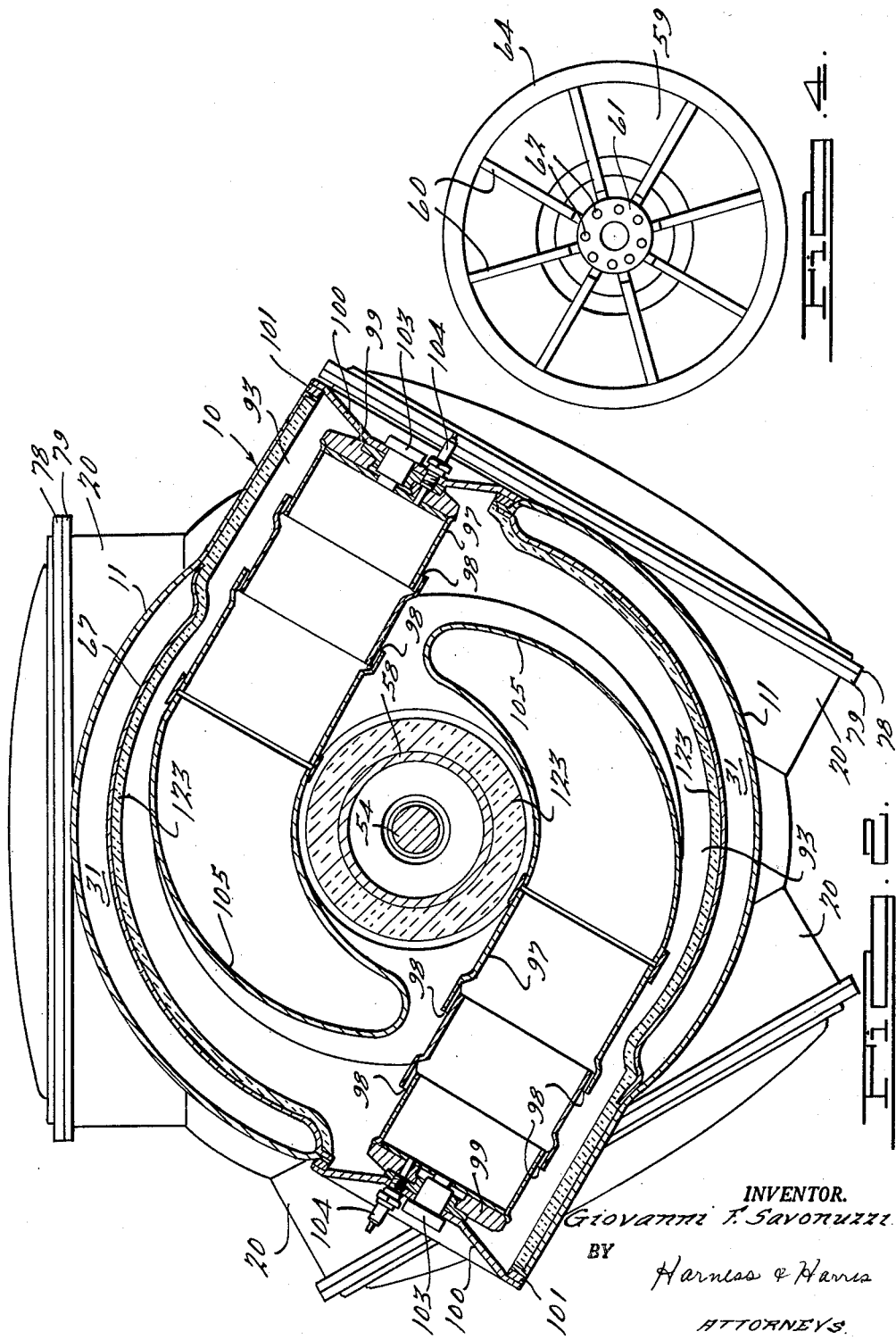

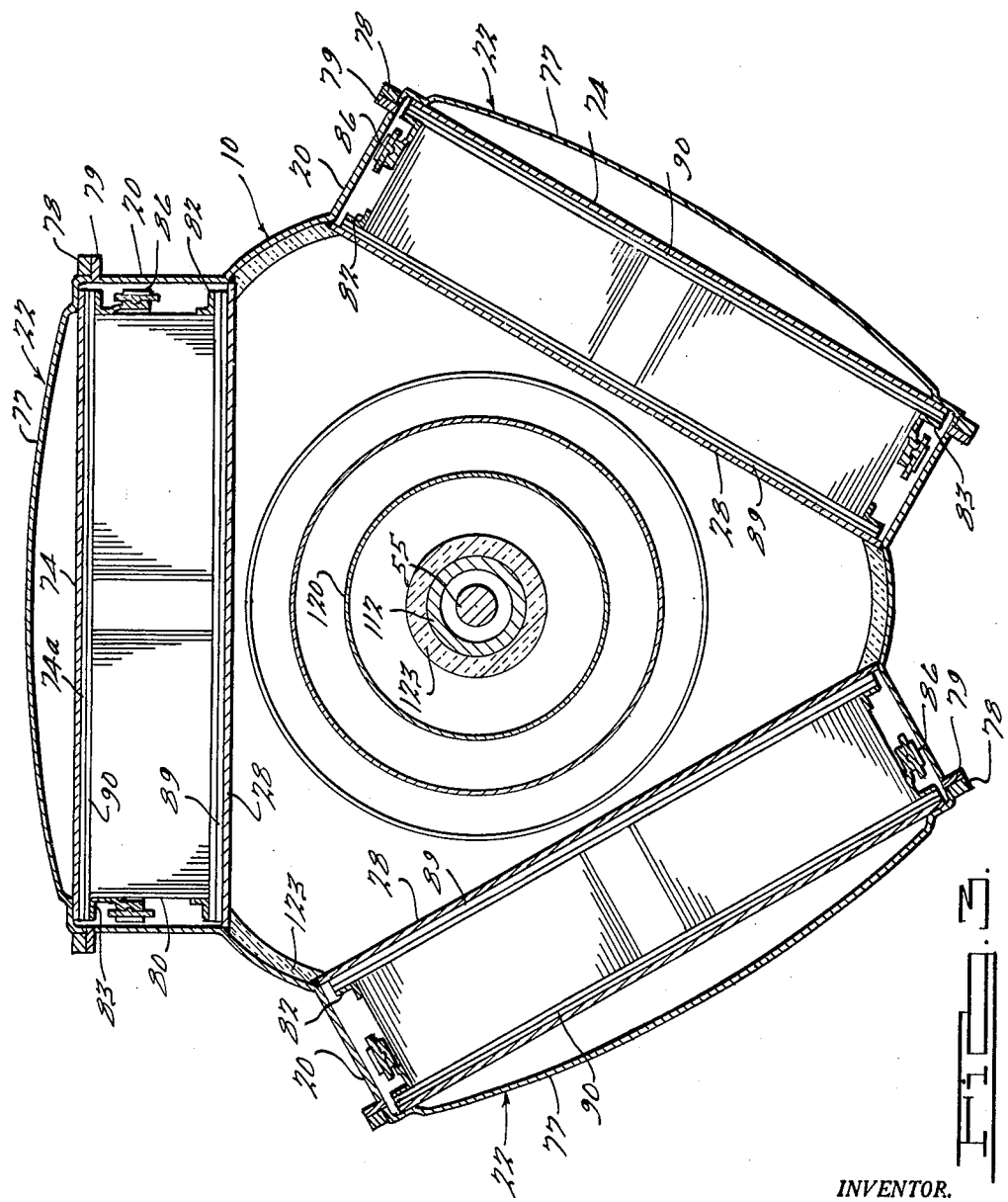

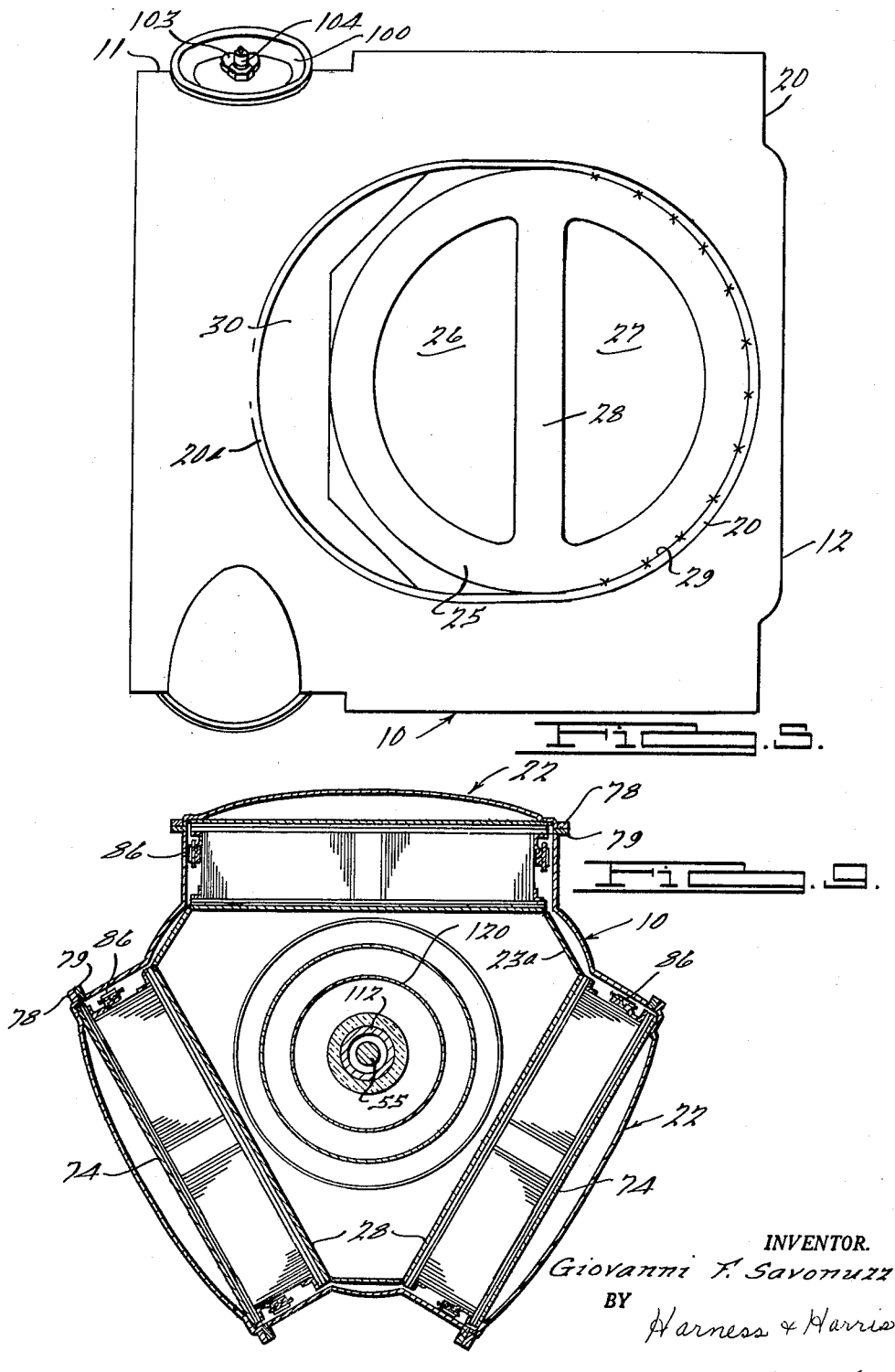

United States Patent Office 3,167,914
Patented Feb. 2, 1965

3,167,914
GAS TURBINE ENGINE HOUSING
Giovanni F. Savonuzzi, Birmingham, Mich., assignor to Chrysler Corporation, Highland Park, Mich., a corporation of Delaware
Filed July 3, 1961, Ser. No. 121,672
12 Claims. (Cl. 60—39.51)

This invention relates to the assembly and arrangements of parts in a gas turbine engine particularly adapted for automotive use.

An object of the present invention is to provide improved means for supporting and housing the rotors, compressor, burners, and speed reducing gearing for an automotive gas turbine engine which is particularly simple, compact, and economical in structure and efficient in operation.

Another object is to provide an improved gas turbine engine having an inner housing containing an annular passage for motive gases. Around the inner housing is an outer housing including an outer shell adapted to be fabricated primarily from sheet steel and having three cylindrical outer extensions projecting radially of the axis of the annular passage at equally spaced locations around said axis to define three cylindrical regenerator chambers. At the base of each regenerator chamber, the inner housing provides a plane platform adapted to support an axial flow regenerator, the axis of rotation of each regenerator extending centrally through the associated supporting platform perpendicularly thereto and to the axis of the annular gas passage. Axially opposite ends of the inner housing are supported by annular supporting structures coaxial with said gas passage and carried by axial end walls of the outer housing. Also coaxial with the gas passage and carried by the end walls respectively of said outer housing are a pair of annular bearing supports which extend toward each other into the space bounded by the inner wall of the annular gas passage and provide journal means for the shafts of a compressor driving rotor and a power rotor rotatable coaxially within said space.

Another object is to provide such an engine wherein said annular supporting structures slidably engage conical end portions of said inner housing under resilient tension at axially opposite ends thereof to accommodate thermally induced relative dimensional changes between said inner and outer housings.

Other objects are to provide such an engine wherein the bearing support for the compressor driving rotor shaft is connected to its respective outer housing end wall by web means adjacent the axis of rotation to minimize thermal stresses at the region of the connection. The latter bearing support also extends radially to an annular rim in sliding engagement with the end wall at a location spaced from said region of connection to provide adequate leverage for supporting the compressor driving rotor.

Another object is to provide such an engine wherein the end wall which carries the bearing support for the compressor rotor comprises a compressor wall and cooperates with an outer portion of said shell to define a housing for an axial flow compressor mounted on an axial endwise extension of the shaft for the compressor driving rotor. The compressor discharges radially into an annular diffuser formed between the compressor wall and outer shell portion which are connected together and spaced apart by suitable diffuser blades. A resilient annular baffle carried by the compressor wall coaxially with the rotors extends toward the juxtaposed axial end of the inner housing and terminates in a conical surface yieldingly and slidably engaging a mating conical surface of the inner housing to urge the latter in the direction axially away from the compressor wall. The annular space between the baffle and outer shell comprises an inlet air duct connecting each regenerator chamber with the radially outer discharge end of said diffuser. Between the baffle and bearing support for the compressor driving rotor shaft is an annular chamber containing a pair of spirally arranged burners adapted to receive combustion supporting inlet air from the regenerators and to discharge the gaseous combustion products into the upstream end of the annular motive gas passage.

Another object is to provide an engine of the above character wherein the shaft for the power rotor is connected with a power take-off gear by means of a speed reducing gear train contained within the space bounded by the annular bearing support for the power rotor.

Still another object is to provide such an engine wherein the regenerator supporting platform is welded to the base of the cylindrical regenerator chamber around approximately half the circumference thereof located downstream of a plane transverse to the rotor axis and containing the axes of the three regenerators, the upstream half of said platform being spaced from said outer shell to provide communication between said regenerator chambers and aforesaid annular air inlet passage.

Other objects of this invention will appear in the following description and appended claims, reference being had to the accompanying drawings forming a part of this specification wherein like reference characters designate corresponding parts in the several views.

FIGURE 1 is a longitudinal mid sectional view through the rotor axis of a gas turbine engine embodying the present invention.

FIGURE 2 is a transverse sectional view taken in the direction of the arrows substantially along the line 2—2 of FIGURE 1.

FIGURE 3 is a transverse sectional view taken in the direction of the arrows substantially along the line 3—3 of FIGURE 1.

FIGURE 4 is a reduced elevational view of the bearing support for the compressor driving rotor shaft, taken in the direction of the arrows along the line 4—4 of FIGURE 1.

FIGURE 5 is a sectional view taken in the direction of the arrows substantially along the line 5—5 of FIGURE 1, the regenerator being removed to illustrate details of the regenerator supporting platform.

FIGURE 6 is a longitudinal mid sectional view showing a modification of the inner housing and the supporting structure therefor.

FIGURE 7 is an enlarged view of the portion of FIGURE 6 enclosed within the circle 7.

FIGURE 8 is an enlarged view of the portion of FIGURE 6 enclosed within the circle 8.

FIGURE 9 is a transverse sectional view taken in the direction of the arrows substantially along the line 9—9 of FIGURE 6.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings a gas turbine engine is illustrated by way of example comprising an outer housing formed primarily from a sheet steel outer shell having coaxial cylindrical upstream and downstream end portions 11 and 12 respectively. The larger cylindrical end portion 11 is welded to an annular reinforcement 13 suitably secured by bolts 14 to an end closure 15 which may comprise an aluminum casting and is formed to provide a radial portion 15a terminating in an axially endwise cylindrical outer compressor housing portion 15b. The latter opens axially endwise at an air inlet 16 to receive combustion supporting air which is supplied to the engine in accordance with the operation of a compressor as described below. The smaller cylindrical portion 12 is welded to an L-section annular reinforcing member 17 which is secured by bolts 18 to a cast aluminum end closure plate 19.

As illustrated particularly in FIGURES 2 and 3, the outer shell of housing 10 is formed with three cylindrical walls 20 which extend radially of the axis of cylindrical portions 11, 12 and which are preferably spaced uniformly around the circumference of the latter axis. Each of the cylindrical walls 20 encloses a regenerator chamber 21 and is covered by a sheet steel dome 22 comprising part of the outer housing shell.

Arranged coaxially within the outer housing 10 is an inner housing indicated generally by the numeral 23 and suitably formed from sheet steel. As illustrated in FIGURE 1, between the regenerator chambers 21, the inner housing 23 terminates at 24 and is suitably secured, as for example by welding, to the outer shell of housing 10. In the circumferential spaces between the welds 24, the inner housing 23 is provided with three regenerator supporting platforms 25, FIGURE 5, each platform 25 extending perpendicularly to a radius from the axis of cylindrical portions 11 and 12 and being located at the base of one of each of the regenerator chambers 21. Each platform 25 is also provided with high pressure and low pressure sector openings 26 and 27 respectively partitioned by a diametrically extending cross portion 28 arranged in a transverse or radial plane through the welds 24. Also as illustrated in FIGURE 5, approximately half of the outer circumference of each platform 25 around the low pressure sector opening 27 is welded at 29 to the base of the associated cylindrical wall 20. Upstream of each weld line 29, the cylindrical wall 20 is enlarged to an out-of-around portion 20a which extends upstream of the associated platform 25 to provide a space 30, FIGURES 1 and 5, opening into an annular air inlet duct 31 to receive compressor air therefrom as described below.

Extending radially inwardly from the transverse mid region of inner housing 23 is an annular bulkhead structure 32 adjustably connected with an outer shroud 33 for an annular gas passage 34 by means of a ring 35 secured to the radially inner end of the bulkhead 32. The ring 35 is in rotational and radially sliding contact with a mating radial shoulder of an adjustable ring 36 extending coaxially around the passage 34 and having an inner spherical surface in sliding contact with a concentric outer spherical surface of an annular shoulder 37 of shroud 33. The passage 34 extends coaxially with the outer shell portions 11 and 12 and contains a plurality of circumferentially spaced fixed nozzles 38 secured at their radially inner edges to an annular inner shroud section 39. The central portion of the latter is closed by a baffle 40 secured to the section 39 by bolts 41 which also secure an annular shroud section 42 to the section 39 to complete an intermediate inner shroud for the passage 34.

The upper edge of each fixed nozzle 38 is welded to a semi-circular bushing half 43 seated snugly within a recess in outer shroud 33 and mating with a second bushing half 44 also seated within outer shroud 33 to complete a circular split bushing enclosing the lower end of a rotatable spindle 45 secured at its lower end to an adjustable nozzle 45a located within passage 34 immediately downstream of the associated fixed nozzle 38. The upper end of at least one of the spindles 45 is keyed to a swinging arm 46 having an outer ball end slidably confined within a pair of plates 47. The plates 47 extend generally radially and axially from a ring 48 to which they are secured and which is rotatably mounted on a cylindrical platform 49 of shroud 33 coaxial with the latter and with the axes of the cylindrical shell portions 11 and 12. Reference is hereby made to copending applications Serial No. 34,172, filed June 6, 1960, now Patent No. 3,089,679, and Serial No. 59,101 filed September 28, 1960, now Patent No. 3,078,071, and copending application S.N. 121,395, filed July 3, 1961, for details of the structure and operation of the adjustable support for the outer shroud 33 as well as for the mounting and adjustment of spindles 45 and intermediate inner shroud 39, 42.

Rotatable coaxially within the inner housing 23 is a compressor driving rotor 50 and a power rotor 51 having peripheral blades 52 and 53 respectively extending into annular passage 34 to be driven by axially flowing gases therein. Rotors 50 and 51 are mounted on coaxial shafts 54 and 55 extending axially endwise in opposite directions, FIGURE 1. Shaft 54 is journalled in bearings 56 and 57 carried by an annular bearing support 58 which may comprise a steel casting. The support 58 includes an integral radially inwardly directed plate 59 having a plurality of circumferentially spaced and radially extending ribs 60, FIGURE 4, and a central annular hub portion 61 secured by bolts 62 to a compressor wall 63 defining an inner end wall of housing 10. The hub 61 carries the bearing structure 57 and extends closely around the axis of shaft 54 so as to minimize thermally induced stress on end wall 63 at the region of connection of the latter with support 58. The latter also has a radially enlarging portion which terminates in an annular rim 64 in sliding contact with a portion of end wall 63 spaced sufficiently radially from hub 61 to provide adequate leverage for support of the bearing structure 56 adjacent rotor 50.

By virtue of the ribs 60 and rim 64 in sliding contact with the wall 63, relative thermal expansion of the latter with respect to support 58, is readily accommodated without impairing the support for bearing structures 56 and 57. The inner compressor wall 63 is spaced from the outer compressor wall 15 by suitable diffuser blades 65 integral with wall 63 and secured to wall portion 15a by bolts 66. Thus the annular passage between the inner and outer end walls 63 and 15a define a diffuser discharging into the annular inlet air duct 31. The inner wall of the latter duct is defined by an annular baffle 67 of resilient sheet steel suitably secured to the periphery of wall 63. The baffle 67 extends cylindrically in parallelism and in spaced relationship with outer shell wall 11, then extends conically toward inner housing 23 and terminates in an annular reinforcing ring 68 having a conical surface in sliding engagement with a parallel conical surface of a reinforcing ring 69 welded to an axial end flange of housing 23. The ring 69 extends coaxially with inner housing 23 and the rotors 50 and 51 and is yieldingly urged to the right in FIGURE 1 by the resiliency of baffle 67.

Within the cylindrical housing portion 15b, a compressor hub 70 is secured by bolt 71 coaxially to shaft 54 for rotation therewith. Radial compressor blades 72 rotatable with hub 70 draw combustion supporting air through the inlet 16 and discharge this air under pressure into the annular diffuser and thence via passage 31 to the regenerator chambers 21. The cover 22 over each chamber 21 is formed to provide an inlet dome 73 overlying the high pressure sector opening 26 in platform 25. The dome 73 slopes inwardly from the upstream edge of housing 21 and terminates in a plate 74 parallel to platform 25 and having a sector opening 74a therein overlying and coextensive with the low pressure sector opening 27. A second part of cover 22 comprises an exhaust dome 75 overlying the sector openings 74a and 27 and having a flat portion 76 welded to a transverse portion of plate 74 coextensive with the transverse portion 28 of platform 25. The flat portion 76 is raised at 77 to provide a transverse reinforcing beam. Welded around the periphery of each cover 22 is a reinforcing ring 78 suitably secured to a reinforcing ring 79 welded to the housing 10 around the outer edge of the associated cylindrical wall 20.

Mounted on the platform 25 within each regenerator chamber 21 is a cylindrical regenerator disc 80 rotatable about a central hub 81 and comprising a matrix of separate gas passages extending axially of hub 81. Defining the lower and upper rims of each regenerator 80 are annular L-section brackets 82 and 83 respectively. The cylindrical leg of bracket 83 terminates in a plurality of resilient fingers 84 spaced around and offset from the circumference of the associated regenerator 80 and formed with a circumferential outwardly opening groove adapted to receive a mating annular bead 85 integral with the inner circumference of a ring gear 86. The bead 85 is pivotal within the mating groove to enable thermal distortion of the regenerator 80 without causing deflection of ring gear 86 from its desired position coaxial with the axis of hub 81. Accordingly, the gear 86 is maintained in driven engagement with pinion gear 87 with a minimum of noise and wear. Pinion 87 is mounted within a plate 88 carried by cylindrical wall 20 of outer housing 10. Preferably a plurality of idler gears also carried by housing 10 engage ring gear 86 in the manner of gear 87 at locations around the circumference of the regenerator 80 to maintain the latter in its desired alignment centered on platform 25.

Extending completely around the low pressure sector opening 27 is a suitable seal 89 which slidably engages the radially inner surface of the associated regenerator 80 in sealing engagement and which is also secured to platform 25. A similar seal 90 secured to plate 74 extends completely around the sector opening 74a immediately above the opening 27 and slidably engages the radially outer surface of the associated regenerator in sealing engagement, the seals 89 and 90 being effective to prevent the flow of high pressure gases from chamber 21 into the sector openings 27 and 74a. Also extending around the high pressure sector opening 26 is a seal 91 similar to seal 89 and supported by platform 25. The latter seal is designed to prevent flow of high pressure gases from chamber 21 into the sector opening 26.

In accordance with the arrangement of the regenerators 80 and seals described, the high pressure combustion supporting gases entering each chamber 21 from the air inlet duct 31 flows radially inwardly through the regenerator gas passages to absorb heat therefrom and are discharged into a region 92 of intermediate pressure immediately below sector opening 26. From region 92, the high temperature gases flow into the generally annular area 93 bounded by the support 58, baffle 67, and an extension 94 of support 58 which terminates in an annular support 95 coaxial with the rotors 50 and 51. The support 95 carries a plurality of circumferentially spaced fixed nozzles 96 located within the annular gas passage 34 in supporting engagement with outer shroud 33.

Supported within annular chamber 93 are a pair of hollow cylindrical combustion chambers 97, FIGURE 2, having a plurality of annularly arranged air inlet openings 98. Each combustion chamber 97 is closed at one end by a plate 99 secured by a dished cover 100 to a reinforcing ring 101 suitably secured to portions of the outer housing 10. As illustrated in FIGURE 2, the baffle 67 at the region of the burners 97 comprises two parts, each extending coaxially with the shell portion 11 from a portion of one of each of the reinforcing rings 101 and being welded to the shell portion 11 adjacent the combustion chamber 97 which is supported by the other of the reinforcing rings 101. Each end closure 99 and plate 100 support a fuel nozzle 103 and igniter 104, which discharges fuel into the combustion supporting air and ignites the mixture in accordance with customary practice.

Extending spirally from each combustion chamber 97 oppositely from the end closure 99 is a tapering gas duct 105, the small ends of the two ducts 105 eventually merging to form a discharge opening 106 in communication with the inlet of annular passage 34. At the region of the opening into annular passage 34, the wall of discharge opening 106 is partitioned, one edge being welded at 107 to the outer shroud 33 and the other edge 108 being sleeved over an extension of the supporting ring 95 to complete a continuous fluid tight communication from the burners 97 to the gas passage 34.

Thus motive gases discharged from the burners 97 into annular passage 34 drivingly engage the rotor blades 52 and 53 and then exhaust into a collecting chamber 109 immediately below the low pressure sector opening 27 in platform 25. Thereafter the exhaust gases flow radially outwardly through the matrix of the regenerator 80 at the region bounded by sector openings 27 and 74a and are exhausted into dome 75. During the passage of the exhaust gases through the regenerator, the latter is heated, whereupon as the heated portion of the regenerator is continuously rotated to the region of the inlet gases flowing through sector opening 26, these latter gases are heated by passing through the regenerator. The energy of the motive gases flowing in passage 34 is selectively prorated between the rotors 50 and 51 by angularly adjusting the nozzles 45a in accordance with pivoting of shafts 45 as determined by rotation of ring 48 on cylindrical platform 49.

The rotor shaft 55 is journalled in bearings 110 and 111 carried by an annular bearing support 112 which is similar in construction to bearing support 58 and which terminates in a flange 113 confined between plate 19 and flange 17 and secured thereto by the bolts 18. Reinforcing web 114, similar to web 59, is secured to support 112 by bolts 115, the web 114 providing support for the bearing 111. In the space between web 114 and end plate 19 and suitably mounted on the latter is a speed reducing gear train indicated generally by numeral 116. The latter operably connects shaft 55 with an axial power take-off shaft 117 for driving the vehicle and also with a radial power take-off shaft 118 for driving the pinion 87 and accordingly the regenerator 80 at low speed. A flange 119 at the inner end of support 112 is secured to a radially inwardly directed flange 120a of an annular inner shroud extension 120. The latter extends generally axially from adjacent the roots of the blades 53 to adjacent the support 112 and cooperates with the latter to define the terminal of annular gas passage 34. The radial extension 120a is clamped against flange 119 by means of a clamp ring 121 and bolts 122.

Suitable thermal insulating material 123, which may comprise a heat resistance ceramic, extends around the exterior of the annular support 112, along the interior of the inner housing portions 10 and 23 as illustrated in FIGURE 1, at opposite sides of the bulkhead 32 which partitions the high temperature and high pressure inlet gases of chamber 92 from the comparatively low temperature and low pressure exhaust gases at 109, and the confronting portions of annular baffle 67 and support 58 enclosing the burners 97. In order to equalize the pressure at opposite sides of end wall 63, the latter is provided with a plurality of pressure equalizing ducts 124 at the region of the webs 60.

A modification of the invention is illustrated in FIGURES 6 and 8 wherein the inner housing 23 is adjustably mounted within the outer housing 10 in order to accommodate thermally induced relative dimensional changes. Instead of being welded at 24 to the outer housing 10, as in FIGURE 1, the portions of the inner housing 23 between the platforms 25 extend arcuately at 23a and terminate adjacent plate 19 in an axially directed flange welded to an annular reinforcement 126 coaxial with the rotors 50 and 51. The reinforcement 126 is provided with a conical surface 126a in sliding engagement with a mating conical surface 112a of support 112, FIGURE 8. By virtue of the resiliency of baffle 67 and the pressure of the motive gases urging inner housing 23 to the right in FIGURE 6 (see also FIGURE 1) the mating conical surfaces of parts 68 and 69 and also the mating conical surfaces 112a and 126a adjustably engage each other in fluid sealing relation. The angle of the conical surface 112a is determined so as to coincide approximately with the angle of the resultant force S of the axial forces A and the radial forces R. The axial forces A are determined primarily by the pressure of the motive gases applied against the effective area of the upstream or high pressure side of inner housing 23, as for example against the bulkhead 32, baffle 40, and nozzles 38 and 45a. The radial force R is determined primarily by thermally induced expansion of the inner housing 23 relative to the outer housing 10 during operation of the engine. Thus the plane of engagement between surfaces 112a and 126a is substantially parallel to the direction of movement of inner housing 23 urged by the forces A and R.

I claim:

1. In a gas turbine engine having a pair of coaxial rotors, an outer housing, an inner housing within said outer housing and containing said rotors, journal means carried by said outer housing and rotatably supporting said rotors, annular gas passage means supported by said inner housing coaxially with said rotors for conducting motive gases thereto, baffle means subject to the axial pressure of said motive gases and carried by said annular gas passage means to close the area radially inwardly thereof at a location between said rotors, said inner housing being thereby urged axially in the downstream direction by said pressure, a plurality of domes in said outer housing at locations spaced around the axis of said gas passage means and rotors, a corresponding plurality of platforms carried by said inner housing, each platform extending transversely to a radius from said axis and having gas passage sectors opening radially therethrough, each platform also being spaced radially inwardly from the outer surface of one of each of said domes to provide a regenerator chamber, said inner and outer housing slidably engaging each other at axially opposite ends of said inner housing to support the latter, the sliding engagement between said housings at the downstream end of the inner housing being at mating conical surfaces of said housings coaxial with said rotors and enlarging in said downstream direction.

2. In a gas turbine engine having a pair of coaxial rotors, an outer housing, an inner housing within said outer housing and containing said rotors, a plurality of domes in said outer housing at locations spaced around the axis of said rotors, a corresponding plurality of platforms carried by said inner housing, each platform extending transversely to a radius from said axis and having gas passage sectors opening radially therethrough, each platform also being spaced radially inwardly from the outer surface of one of each of said domes to provide a regenerator chamber, and means carried by said outer housing engaging axially opposite ends of said inner housing to support the same, the last named means including a resilient baffle extending around said axis and in the axial direction from adjacent one axial end of said outer housing to the juxtaposed axial end of said inner housing and yieldingly engaging the latter to urge the same in said direction.

3. The combination according to claim 2 wherein said baffle and inner housing engage each other in sliding relation at a conical surface to accommodate thermally induced dimensional changes between said inner and outer housings.

4. In a gas turbine engine, an outer housing, an inner housing within said outer housing and defining in part an annular passage for motive gases, a plurality of regenerator chambers in the outer portions of said outer housing and spaced circumferentially around the axis of said annular passage, said inner housing having a separate regenerator supporting platform at the base of each chamber, and means carried by said outer housing engaging axially opposite ends of said inner housing to support the same including a resilient conical support coaxial with said axis and yieldingly engaging a mating conical portion of said inner housing to urge said inner housing axially in one axial direction.

5. In a gas turbine engine, an outer housing, an inner housing within said outer housing and defining in part an annular passage for motive gases, a plurality of regenerator chambers in the outer portions of said outer housing and spaced circumferentially around the axis of said annular passage, and means carried by said outer housing engaging axially opposite ends of said inner housing to support the same including a resilient baffle extending around said axis and in the direction of flow of said motive gases from adjacent one axial end of said outer housing to said inner housing and terminating in a conical end yieldingly engaging a mating conical portion of said inner housing to urge the same in said direction, said baffle being spaced radially from the outer wall of said outer housing to comprise therewith an annular inlet air duct discharging into said chambers.

6. The combination according to claim 5 comprising in addition an axial flow air compressor coaxial with said annular passage and discharging radially into an annularly arranged diffuser defined by interconnected inner and outer walls, said outer wall being a continuation of the outer wall of said outer housing, said inner wall being spaced axially inwardly of said outer wall and being connected to the axial outer end of said baffle, and said diffuser discharging into said inlet air duct.

7. In a gas turbine engine, an outer housing, an inner housing within said outer housing and defining in part an annular passage for motive gases, a plurality of regenerator chambers in the outer portions of said outer housing and spaced circumferentially around the axis of said annular passage, said inner housing having a separate regenerator supporting platform at the base of each chamber, a pair of conical supports coaxial with said annular passage and carried by said outer housing at the axially opposite ends respectively of said inner housing, said conical supports slidably engaging mating conical portions of said inner housing in supporting relation, and at least one of said conical supports being resiliently urged yieldingly against its mating conical portion to accommodate thermally induced dimensional changes between said inner and outer housings.

8. In a gas turbine engine, an outer housing, an inner housing supported within said outer housing and defining in part an annular passage for motive gases, said outer housing including an end wall spaced axially from said inner housing, bearing supporting means extending around the axis of said annular passage and axially into the space bounded by said annular passage, a rotor shaft journalled in said supporting means and extending at one end into said space along said axis, said supporting means enlarging radially in the axial direction toward said end wall and terminating in sliding engagement with said wall at locations remote from said axis, said supporting means also having a portion rigidly secured to said wall at locations adjacent the periphery of said shaft.

9. In a gas turbine engine, an outer housing, an inner housing supported within said outer housing and defining in part an annular passage for motive gases, said outer housing including an end wall spaced axially from said inner housing, annular bearing supporting means coaxial with said annular passage and extending axially into the space bounded by said annular passage, a rotor shaft journalled in said supporting means and extending at one end into said space along said axis, the journal support for said shaft including bearing means within said space and second bearing means adjacent said end wall, said supporting means enlarging radially in the axial direction toward said end wall and terminating in sliding engagement with said wall at locations remote from said axis, said supporting means also having a portion rigidly secured to said wall at locations adjacent the periphery of said shaft, the last named portion also supporting said second bearing means.

10. In a gas turbine engine, an outer shell, an inner housing within said shell and defining in part an annular passage for motive gases, a plurality of regenerator chambers in said shell and spaced circumferentially around the axis of said annular passage, an end wall carried by said shell at a location axially upstream of said inner housing, a baffle engaging upstream portions of said housing in supporting relation and extending axially therefrom around said axis to said end wall at a location radially inwardly of said shell, bearing supporting means extending axially from said end wall around said axis at a location radially inwardly of said baffle, a pair of combustion chambers within the space between said baffle and bearing supporting means at opposite sides of said axis, a separate spiral gas passage extending from each combustion chamber spirally around said axis and in an axial downstream direction, each spiral passage tapering in the direction away from its combustion chamber and terminating in a common header in communication with the upstream end of said annular gas passage.

11. In a gas turbine engine, an outer shell, an inner housing within said shell and defining in part an annular passage for motive gases, an end wall carried by said shell at a location axially upstream of said inner housing, radially inner and outer baffles extending around the axis of said passage, spirally arranged combustion chamber means in the annular space between said inner and outer baffles, said outer baffle being secured in supporting relation to upstream portions of said housing and extending axially therefrom to said end wall at a location spaced radially inwardly of said shell, said inner baffle comprising a bearing support and extending axially into the space bounded by said annular passage, and a rotor shaft journaled in said bearing support coaxially with said annular passage and extending into said space.

12. In a gas turbine engine, an outer housing, an inner housing within said outer housing and defining in part an annular passage for motive gases, a conical support coaxial with said annular passage and carried by said outer housing adjacent an axial end of said inner housing, said conical support slidably engaging mating conical portions of said inner housing in supporting relation and being resiliently urged yieldingly against said mating conical portions to accommodate thermally induced dimensional changes between said inner and outer housings.

References Cited in the file of this patent
UNITED STATES PATENTS

| | | |
|---|---|---|
| 2,795,928 | Huebner et al. | June 18, 1957 |
| 2,803,438 | Hryniszak | Aug. 20, 1957 |
| 3,077,074 | Collman et al. | Feb. 12, 1963 |

FOREIGN PATENTS

| | | |
|---|---|---|
| 615,680 | Great Britain | Jan. 10, 1949 |